July 12, 1949.　　　J. W. LESS ET AL　　　2,476,101
COLLAR ATTACHMENT
Filed Feb. 14, 1947
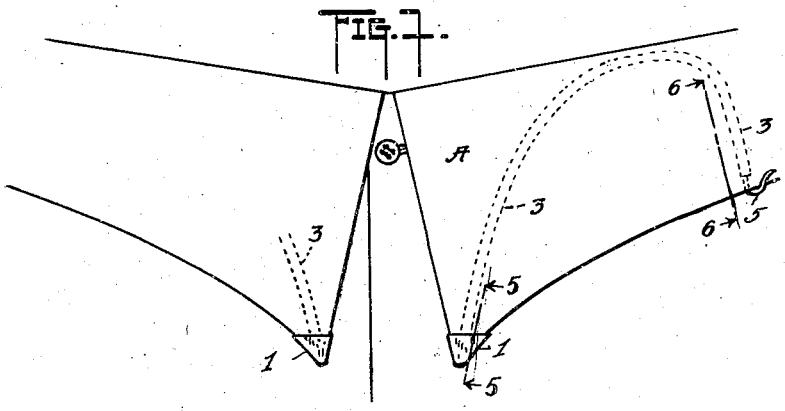
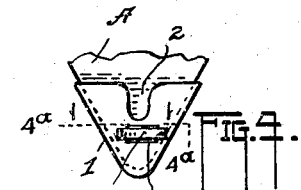
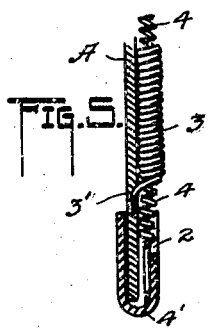
Inventors
J. W. Less,
A. J. Less,
By L. M. Thurlow
Attorney Patented July 12, 1949

2,476,101

UNITED STATES PATENT OFFICE 2,476,101

COLLAR ATTACHMENT

Joseph W. Less, Clinton, and Albert J. Less, Cedar Rapids, Iowa

Application February 14, 1947, Serial No. 728,656

5 Claims. (Cl. 2—132)

This invention pertains to collar attachments the purpose of which, as a class, serving to control the points of a shirt collar and hold them in close relation to the shirt bosom.

An object of the invention is to employ a pair of spiral, lineally extending springs, one within the other, while combining therewith a novel structure for controlling the collar points.

Another object is to provide parts for a collar attachment which are visible and attractive to those persons who prefer a novel appearance in their dress, all of which will be brought out herein aided by the accompanying drawing forming part hereof.

In said drawing, Figure 1 illustrates a front elevation of a collar and a collar attachment in place therein.

Figure 2 is a plan of a member, much enlarged, engaging a collar point.

Figures 3 and 4 are elevations of the member of Figure 2 showing the front and rear sides thereof, respectively.

Figure 4$^a$ is a plan of part of Figure 4 produced on line 4$^a$—4$^a$ of the latter figure.

Figure 5 is a transverse sectional elevation of a collar point in elevation showing a terminal of the collar attachment applied thereto, also much enlarged, and produced on line 5—5 of Figure 1.

Figure 6 is a transverse sectional elevation of the collar with which is illustrated hook terminating an extremity of the collar attachment produced on line 6—6 of Figure 1, and Figure 7 is a detail in elevation of part shown in Figure 6 somewhat enlarged thereover.

While providing a pair of spiral springs to lie within a collar as shown in our copending patent application Ser. No. 728,655 filed in the U. S. Patent Office Feb. 14, 1947, it is the purpose to employ therewith novel parts effective in use, while having a decorative value attractive to those who prefer to show in their wearing apparel ornamental features; in this present instance at the collar.

In Figure 1 the collar A of the conventional type, and in this instance as part of a shirt, an ornamental so called "tip" 1 is provided. This, as shown much enlarged in Figures 3 and 4 is of triangular form in aspect while recessed, as in Figures 2 and 5, to receive a collar point into it, its rear wall, for convenience only, as will appear, having a notch 2 opening upon the top edge of said wall. Extending from said tip in said Figure 1 is a spring structure shown in Figures 5, 6 and 7, consisting of an outer spring 3 and a smaller spring 4 within it, the diameter of which is such as to permit it to shift under stress within the bore of said outer spring. The extremity 3' of the latter adjacent the tip 1 is sharpened as in Figure 5 adapted to impale the collar point, as will be brought out later, while the adjacent end of the inner spring denoted at 4' is suitably affixed to rear inner wall surface of said tip, the spring end itself lying within and accommodated by the named notch 2, so that the tip may be kept as thin as possible and will also admit the collar point into it, as Figure 5 shows.

Returning, again to Figure 1, the combined springs extend toward and into the collar fold, thence extending downwardly toward the collar edge and provided with a member 5 which in this instance takes the form of a hook, though this may be of any other form, such as a clasp, for example, but not shown, said hook engaging over the collar edge.

It may be stated, however, that the device may be used with or without the hook 5, the spring, instead, lying wholly along the collar fold if desired. The use of the hook or its equivalent especially if of the appearance of gold or silver being the choice of the wearer if he is disposed to exhibit it. For the latter reason, too, the tips 1, preferably of metal, may likewise be made attractive and decorative when of gold or other precious metal.

The extremities of the springs at the hook 5 are affixed to the latter as suggested in Figures 6 and 7 where 3$^2$ and 4$^2$ represent said extremities, but in the event the hook is not employed these extremities may be secured to each other, not shown.

The convolutions of the outer spring 3 abut each other, as illustrated, the spring 4, however, being free to be placed under stress or pull.

In the application of the device to the collar, one end of the spring structure is pushed up into the collar fold while the other end carrying the tip 1 is left suspended. By grasping the tip at the thus suspended extremity it may be pulled upon by the fingers of one hand to stretch the inner spring 4 while at the same time the finger and thumb of the other hand may impale the point 3' of the outer spring 3 in the collar point, Figure 5. Upon releasing the tip the reflex action of the said inner spring will draw said tip to seat upon the collar point and toward the point 3' whereupon the device has full control of said collar point. And since the laterally flexed spring structure tends to straighten itself throughout its length the tip and the collar point are drawn toward the shirt bosom to the desired close relation of the point with respect to the latter.

In Figures 4 and 4ª it is noted, as an additional structure, that a slot 5' may be produced in the rear wall of the tip 1 through which a spring 6 at one end may extend to enter the cavity of said tip to engage the collar point, the other end being secured to said wall. Normally, the free extremity of the spring would engage the collar point frictionally, and this friction grip may be in addition to the normal pull of the spring. By this additional structure, too, a tip since novel, might be placed on each collar point even though the balance of the collar attachment structure were not at once employed, or independent thereof, the springs 6 serving to hold a tip in place, or without requiring connection of the terminal of the spring to said tip.

We claim:

1. A collar attachment including in its construction a pair of spiral springs lying one within the other adapted to lie between the folds of a collar and extending from near the point of a collar toward and lying in the collar fold, and fixed relative to each other at their ends at said fold, a cavitied tip to engage over the point of the collar and having the end of one of the springs at their other ends attached thereto, the spring having attachment at its said end to said tip being constantly under tension, the end of the other spring at the last named ends thereof adapted to impale the collar point to oppose the pull of the companion spring.

2. A collar attachment including in its construction a pair of spiral springs lying one within the other, part thereof adapted to lie between the folds of a collar and extending therefrom to the point of the collar, said springs at their ends within the collar being fixed relative to each other, a tip engaging said point of the collar, the end of the inner spring being under tension and fixed at its end to said tip, the outer spring at said tip being unyielding and at its end impaling the collar point, said inner spring acting to maintain engagement of the tip with said point and forcing said point toward the impaling end of said outer spring.

3. The invention described in claim 2 wherein the spring portions lying between the folds of the collar extend from the collar fold down to the lower edge of the collar, and a member secured to the springs and engaging the collar at said edge thereof.

4. A collar attachment including in its construction a tip adapted to engage over the point of a collar, a structure including a coil spring attached at one end to said tip, its other end lying in the fold of the collar, and a second spring as a part of said structure, one end thereof having an impalement point at one end engaging the said point of the collar, its other end also lying in said fold of the collar, the springs acting jointly in opposite directions to maintain the tip and said collar point in engagement.

5. A collar attachment including in its construction a tip engageable over the point of a collar, a structure including a coil spring attached at one end to said tip and at its other end lying in the fold of the collar adapted to exert a pull on said tip to maintain engagement of the latter with the collar point, said tip having a tension member to frictionally engage the collar point, and a second spring as a part of said structure, the same enclosing the first named spring, being pointed at one end and impaling the collar point while directed toward said tip, the other end of said second spring also lying in said fold of the collar.

JOSEPH W. LESS.
ALBERT J. LESS.

REFERENCES CITED

The following references are of record in the file of this patent:

UNITED STATES PATENTS

| Number | Name | Date |
|---|---|---|
| 1,147,577 | Van Tochine | July 20, 1915 |
| 2,192,834 | Kuhn | Mar. 5, 1940 |
| 2,442,294 | King | May 25, 1948 |